US011010137B2

(12) United States Patent
Wang et al.

(10) Patent No.: US 11,010,137 B2
(45) Date of Patent: May 18, 2021

(54) TRUE RANDOM NUMBER GENERATOR WITH DYNAMIC COMPENSATION CAPABILITY

(71) Applicant: Wenzhou University, Zhejiang (CN)

(72) Inventors: Pengjun Wang, Zhejiang (CN); Zhen Li, Zhejiang (CN); Gang Li, Zhejiang (CN); Bo Chen, Zhejiang (CN)

(73) Assignee: Wenzhou University, Zhejiang (CN)

( * ) Notice: Subject to any disclaimer, the term of this patent is extended or adjusted under 35 U.S.C. 154(b) by 101 days.

(21) Appl. No.: 16/404,747

(22) Filed: May 7, 2019

(65) Prior Publication Data

US 2019/0339941 A1 Nov. 7, 2019

(30) Foreign Application Priority Data

May 7, 2018 (CN) .......................... 201810425619.5

(51) Int. Cl.
*G06F 7/58* (2006.01)
(52) U.S. Cl.
CPC .................................. *G06F 7/588* (2013.01)
(58) Field of Classification Search
CPC ............................................ G06F 7/58–7/588
See application file for complete search history.

(56) References Cited

U.S. PATENT DOCUMENTS

| 8,489,660 | B2* | 7/2013 | Herbert | G06F 7/588 |
| | | | | 708/251 |
| 2008/0091755 | A1* | 4/2008 | Mudge | G06F 7/588 |
| | | | | 708/250 |
| 2010/0332574 | A1* | 12/2010 | Herbert | H04L 9/0861 |
| | | | | 708/251 |
| 2015/0178048 | A1* | 6/2015 | Burleson | G06F 7/588 |
| | | | | 708/255 |

(Continued)

OTHER PUBLICATIONS

T. Kuan, Y. Chiang and S. Liu, "A 0.43pJ/bit true random number generator," 2014 IEEE Asian Solid-State Circuits Conference (A-SSCC), KaoHsiung, 2014, pp. 33-36, doi: 10.1109/ASSCC.2014.7008853. (Year: 2014).*

(Continued)

*Primary Examiner* — Aimee Li
*Assistant Examiner* — Carlo Waje
(74) *Attorney, Agent, or Firm* — JCIP Global Inc.

(57) ABSTRACT

A true random number generator with a dynamic compensation capacity comprises a loop control logic, a shift register, a sensitive amplifier and a load matching unit. The sensitive amplifier comprises a first PMOS transistor, a second PMOS transistor, a third PMOS transistor, a fourth PMOS transistor, a first NMOS transistor, a second NMOS transistor and two NMOS arrays. Each NMOS array comprises a third NMOS transistor, a fourth NMOS transistor, a fifth NMOS transistor, a sixth NMOS transistor, a seventh NMOS transistor, an eighth NMOS transistor, a ninth NMOS transistor, a tenth NMOS transistor, an eleventh (Continued)

NMOS transistor, a twelfth NMOS transistor and a thirteenth NMOS transistor. The load matching unit comprises a first D flip-flop and a second D flip-flop and is connected at an output terminal and an inverted output terminal of the sensitive amplifier. The true random number generator has the advantages of simple feedback regulation and high robustness.

2 Claims, 4 Drawing Sheets

(56) References Cited

U.S. PATENT DOCUMENTS

2017/0090872 A1* 3/2017 Mathew .................. G06F 7/483
2020/0042289 A1* 2/2020 Wang ...................... G06F 7/588

OTHER PUBLICATIONS

C. Tokunaga, D. Blaauw and T. Mudge, "True Random Number Generator With a Metastability-Based Quality Control," in IEEE Journal of Solid-State Circuits, vol. 43, No. 1, pp. 78-85, Jan. 2008, doi: 10.1109/JSSC.2007.910965. (Year: 2008).*

Mathew et al., "2.4 Gbps, 7 mW All-Digital PVT-Variation Tolerant True Random Number Generator for 45 nm CMOS High-Performance Microprocessors", IEEE Journal of Solid-State Circuits, Oct. 26, 2012, pp. 807-2821.

* cited by examiner

An expanded view of the sensitive amplifier of FIG. 4

An expanded view of the NMOS array of FIG. 5.

An expanded view of the load matching unit of FIG. 4.

An expanded view of the shift register of FIG. 4.

TRUE RANDOM NUMBER GENERATOR WITH DYNAMIC COMPENSATION CAPABILITY

CROSS-REFERENCE TO RELATED APPLICATION

This application claims the priority benefit of China application serial no. 201810425619.5, filed on May 7, 2018. The entirety of the above-mentioned patent application is hereby incorporated by reference herein and made a part of this specification.

TECHNICAL FIELD

The invention relates to a true random number generator, in particular to a true random number generator with a dynamic compensation capacity.

DESCRIPTION OF RELATED ART

In Document 1 (Mathew S K, Srinivasan S, Anders M A, et al., 2.4 Gbps, 7 mW All-Digital PVT-Variation Tolerant True Random Number Generator for 45 nm CMOS High-Performance Microprocessors[J]. IEEE Journal of Solid-State Circuits, 2012, 47(11): 2807-2821), a true random number generator shown in FIG. 1 is implemented through a metastable design method. According to the true random number generator, a bistable circuit is formed by an inverter inv0 and an inverter inv1; when a clock signal CLK meets CLK=0, a charging switch is turned on, and node a and node b in the circuit are charged by a power supply VDD to a high level; when the clock signal CLK meets CLK=1, the charging switch is turned off, the voltages of node a and node b drop to a metastable potential (VDD/2) first, and then high-low levels are randomly output under the influence of thermal noise. In order to make sure that the circuit accurately enters into the metastable state under the condition of CLK=1, a negative feedback regulation structure involving a rough regulation stage and a fine regulation stage is adopted by the true random number generator: the inverter inv0 and the inverter inv1 are implemented by the structure shown in FIG. 2, a delay cell Delay0 and a delay cell Delay1 are implemented by the structure show in FIG. 3, random numbers output via node b are stored in a shift register formed by four D flip-flops A, B, C and D, a loop control logic (LCL) reads a 4-bit output sequence from the shift register every four clock cycles and generates a control signal according to the output sequence to configure the inverter inv0, the inverter inv1, the delay cell Delay0 and the delay cell Delay1 so as to compensate for process deviations and environmental changes. The true random number generator enters into the rough regulation stage first. Particularly, in the rough regulation stage, the loop control logic generates four 4-bit parallel control signals pconf0, nconf0, pconf1 and nconf1 to regulate the inverter inv0 and the inverter inv1 to eliminate large process deviations, so that output sequences are prevented from being 1 or 0 constantly, wherein nconf0 controls the discharging speed of node b, and nconf1 controls the discharging speed of node a, so that along with the increase of nconf0, the discharging speed of node b is increased, and node b has a larger probability to output potential 0; and similarly, along with the increase of nconf1, node a has a larger probability to output potential 0; pconf0 controls the charging speed of node b, so that with the increase of pconf0, the charging speed of node b is increased, and node b has a larger probability to output potential 1; and similarly, pconf1 controls the charging speed of node a, so that with the increase of pconf1, the charging speed of node a is increased, and node a has a larger probability to output potential 1.

In this way, if the output sequence of the true random number generator in the initial state is constantly 1, the loop control logic sequentially generates control signals nconf1, nconf0, pconf1 and pconf0 to regulate the inverter inv0 and the inverter inv1 till the output sequence turns into 0 from 1 to complete rough regulation, and at this moment, the control signals nconf1, nconf0, pconf1 and pconf0 are maintained in the current state. If the output sequence of the true random number generator in the initial state is constantly 0, the loop control logic sequentially generates control signals nconf0, nconf1, pconf0 and pconf1 to regulate the inverter inv0 and the inverter inv1 till the output sequence turns into 1 from 0 to complete rough regulation, and at the moment, the control signals nconf0, nconf1, pconf0 and pconf1 are maintained in the current state. After rough regulation, the true random number generator enters into the fine regulation stage. Particularly, in the fine regulation stage, the loop control logic generates two 4-bit parallel control signals clkconf0 and clkconf1 to regulate the delay cell Delay0 and the delay cell Delay1, so that the probability of 0 and the probability of 1 of the output sequence are close to 50%, and accordingly, the randomness of the output sequence is improved. With the increase of clkconf1, the delay of the delay cell Delay1 is decreased, and the corresponding terminal has a larger probability to output potential 1; on the contrary, if the delay of the delay cell Delay1 is increased, the corresponding terminal has a larger probability to output potential 0. Similarly, with the increase of clkconf0, the delay of the delay cell Delay0 is decreased, and the corresponding terminal has a larger probability to output potential 1; on the contrary, if the delay of the delay cell Delay 0 is increased, the corresponding terminal has a larger probability to output potential 0. In the fine regulation stage, the loop control logic extracts 4-bit data from the shift register for detection every four clock cycles and then regulates the delay cell Delay0 and the delay cell Delay 1 according to the probabilities of 0 and 1, and thus, the true random number generator can operate within a high-entropy range.

This true random number generator has the following drawbacks: first, the true random number generator will operate in the fine regulation stage all the time after rough regulation and cannot output random sequences under the condition that deviations cannot be compensated through fine regulation after the work environment of the circuit changes drastically or the circuit suffers from an external attack, and consequentially, the circuit robustness is poor; and second, node a and node b of the circuit are a pair of inverted output terminals, sequences are read only from node b in use, and thus, load mismatch of node a and node b is caused, which in turn makes feedback regulation more difficult.

BRIEF SUMMARY OF THE INVENTION

The technical issue to be settled by the invention is to provide a true random number generator with a dynamic compensation capacity to fulfill high robustness and to make feedback regulation easier.

The technical solution adopted by the invention to settle the above technical issue is as follows: A true random number generator with a dynamic compensation capacity comprises a loop control logic and a shift register used for storing output sequences. The loop control logic has a clock terminal, an input terminal, a first output terminal and a second output terminal. The shift register has a clock terminal, a serial data input terminal and a 4-bit parallel data output terminal. The data input terminal of the loop control logic is connected to the 4-bit parallel data output terminal of the shift register and is used to acquire 4-bit output sequences data stored in the shift register. The clock terminal of the loop control logic is connected to the clock terminal of the shift register, and a first clock signal CLK1 is accessed to a connecting terminal of the clock terminal of the loop control logic and the clock terminal of the shift register. The first output terminal of the loop control logic is used to output a first 5-bit parallel control signal. The second output terminal of the loop control logic is used to output a second 5-bit parallel control signal. The true random number generator with a dynamic compensation capacity further comprises a sensitive amplifier and a load matching unit. The sensitive amplifier comprises a first PMOS transistor, a second PMOS transistor, a third PMOS transistor, a fourth PMOS transistor, a first NMOS transistor, a second NMOS transistor and two NMOS arrays. Each NMOS array comprises a third NMOS transistor, a fourth NMOS transistor, a fifth NMOS transistor, a sixth NMOS transistor, a seventh NMOS transistor, an eighth NMOS transistor, a ninth NMOS transistor, a tenth NMOS transistor, an eleventh NMOS transistor, a twelfth NMOS transistor and a thirteenth NMOS transistor, wherein a drain of the third NMOS transistor, a drain of the ninth NMOS transistor, a drain of the tenth NMOS transistor, a drain of the eleventh NMOS transistor, a drain of the twelfth NMOS transistor and a drain of the thirteenth NMOS transistor are connected, and a corresponding connecting terminal is an input/output terminal of the NMOS array; a gate of the third NMOS transistor, a gate of the ninth NMOS transistor, a gate of the tenth NMOS transistor, a gate of the eleventh NMOS transistor, a gate of the twelfth NMOS transistor and a gate of the thirteenth NMOS transistor are connected, and a corresponding connecting terminal is a clock terminal of the NMOS array; a source of the third NMOS transistor, a source of the fourth NMOS transistor, a source of the fifth NMOS transistor, a source of the sixth NMOS transistor, a source of the seventh NMOS transistor and a source of the eighth NMOS transistor are connected, and a corresponding connecting terminal is a ground terminal of the NMOS array; a gate of the fourth NMOS transistor is a first configuration terminal of the NMOS array, a gate of the fifth NMOS transistor is a second configuration terminal of the NMOS array, a gate of the sixth NMOS transistor is a third configuration terminal of the NMOS array, a gate of the seventh NMOS transistor is a fourth configuration terminal of the NMOS array, and a gate of the eighth NMOS transistor is a fifth configuration terminal of the NMOS array; a drain of the fourth NMOS transistor is connected to a source of the ninth NMOS transistor, a drain of the fifth NMOS transistor is connected to a source of the tenth NMOS transistor, a drain of the sixth NMOS transistor is connected to a source of the eleventh NMOS transistor, a drain of the seventh NMOS transistor is connected to a source of the twelfth NMOS transistor, and a drain of the eighth NMOS transistor is connected to a source of the thirteenth NMOS transistor. A power supply is accessed to a source of the first PMOS transistor, a source of the second PMOS transistor, a source of the third PMOS transistor and a source of the fourth PMOS transistor. A gate of the first PMOS transistor and a gate of the fourth PMOS transistor are connected to the clock terminals of the two NMOS arrays, and a corresponding connecting terminal is a clock terminal of the sensitive amplifier. A second clock signal is accessed to the clock signal of the sensitive amplifier, and the first clock signal is a delay signal obtained after the second clock signal is delayed by three fourths of the cycle. A drain of the first PMOS transistor, a drain of the second PMOS transistor, a drain of the first NMOS transistor, a gate of the second NMOS transistor and a gate of the third PMOS transistor are connected, and a corresponding connecting terminal is an inverted output terminal of the sensitive amplifier. A drain of the third PMOS transistor, a drain of the fourth PMOS transistor, a gate of the second PMOS transistor, a gate of the first NMOS transistor and a drain of the second NMOS transistor are connected, and a corresponding connecting terminal is an output terminal of the sensitive amplifier. A source of the first NMOS transistor is connected to the input/out terminal of the first NMOS array, and a source of the second NMOS transistor is connected to the input/output terminal of the second NMOS array. The ground terminals of the two NMOS arrays are grounded. The first configuration terminal of the first NMOS array is a first control terminal of the sensitive amplifier and allows a first bit of the first 5-bit parallel control signal to be accessed thereto; the second configuration terminal of the first NMOS array is a second control terminal of the sensitive amplifier and allows a second bit of the first 5-bit parallel control signal to be accessed thereto; the third configuration terminal of the first NMOS array is a third control terminal of the sensitive amplifier and allows a third bit of the first 5-bit parallel control signal to be accessed thereto; the fourth configuration terminal of the first NMOS array is a fourth control terminal of the sensitive amplifier and allow a fourth bit of the first 5-bit parallel control signal to be accessed thereto; the fifth configuration terminal of the first NMOS array is a fifth control terminal of the sensitive amplifier and allows a fifth bit of the first 5-bit parallel control signal to be accessed thereto; the first configuration terminal of the second NMOS array is a six control terminal of the sensitive amplifier and allows a first bit of the second 5-bit parallel control signal to be accessed thereto; the second configuration terminal of the second NMOS array is a seventh control terminal of the sensitive amplifier and allows a second bit of the second 5-bit parallel control signal to be accessed thereto; the third configuration terminal of the second NMOS array is an eighth control terminal of the sensitive amplifier and allows a third bit of the second 5-bit parallel control signal to be accessed thereto; the fourth configuration terminal of the second NMOS array is a ninth control terminal of the sensitive amplifier and allows a fourth bit of the second 5-bit parallel control signal to be accessed thereto; the fifth configuration terminal of the second NMOS array is a tenth control terminal of the sensitive amplifier and allow a fifth bit of the second 5-bit parallel control signal to be accessed thereto. The load matching unit comprises a first D flip-flop and a second D flip-flop. The first D flip-flop and the second D flip-flop each has a clock terminal, an input terminal and an output terminal, wherein the input terminal of the first D flip-flop is an input terminal of the load matching unit, and the input terminal of the second D flip-flop is an inverted input terminal of the load matching unit; the clock terminal of the first D flip-flop is connected to the clock terminal of the second D flip-flop, and a corresponding connecting terminal is a clock terminal of the load matching unit and allows the first clock signal to be accessed thereto; the output terminal of the first D flip-flop is an output terminal of the load matching unit; the output terminal of the sensitive amplifier is connected to the input terminal of the load matching unit, the inverted output terminal of the sensitive amplifier is connected to the inverted input terminal of the load matching unit, and the output terminal of the load matching unit is connected to the serial data input terminal of the shift register.

The sensitive amplifier generates and outputs one bit of random number at each evaluation stage and is driven by the second clock signal to store the random number into the shift register through the load matching unit, and the loop control logic reads a 4-bit output sequence from the shift register every four clock cycles and generates two 5-bit parallel control signals according to the 4-bit output sequence to dynamically configure or monitor the sensitive amplifier. The loop control logic enters into the dynamic configuration stage first. In the dynamic configuration stage, the loop control logic generates the first 5-bit parallel control signal to regulate the first NMOS array and generates the second 5-bit parallel control signal to regulate the second NMOS array to compensate for process deviations and environment changes, so that the probabilities of 0 and 1 in the random sequence generated by the sensitive amplifier are 40%-60%, wherein the first 5-bit parallel control signal controls the discharging speed of the inverted output terminal of the sensitive amplifier, so that with the increase of the first 5-bit parallel control signal, the inverted output terminal of the sensitive amplifier has a larger probability of potential 0; the second 5-bit parallel control signal controls the discharging speed of the output terminal of the sensitive amplifier, so that with the increase of the second 5-bit parallel control signal, the output terminal of the sensitive amplifier has a larger probability of potential 0; and in the dynamic configuration stage, the loop control logic extracts one 4-bit output sequence from the shift register for detection every four clock cycles and carries out feedback regulation on the sensitive amplifier according to the probabilities of 0 and 1 in the output sequence, so that the true random number generator works within a high-entropy range. When the loop control logic detects that 0 and 1 are uniformly distributed in the 4-bit output sequence (namely 1010 or 0101), configuration of the first 5-bit parallel control signal and the second 5-bit parallel control signal is completed, the first 5-bit parallel control signal and the second 5-bit parallel control signal remain unchanged, and the loop control logic enters into the dynamic monitoring stage. In the dynamic monitoring stage, the loop control logic detects whether or not the output sequence of the sensitive amplifier deviates due to work environment changes, particularly, the loop control logic extracts the 4-bit output sequence from the shift register for detection, and when twelve 1 or 0 are continuously detected in the output sequence of the sensitive amplifier, it is determined that the output sequence is not random anymore, and in this case, the first 5-bit parallel control signal and the second 5-bit parallel control signal which are finally configured in the previous dynamic configuration stage are no longer suitable for the current work environment, and the loop control logic enters into the dynamic configuration stage again; otherwise, the loop control logic stays in the current dynamic monitoring stage, the first 5-bit parallel control signal and the second 5-bit parallel control signal remain unchanged.

The shift register comprises a third D flip-flop, a fourth D flip-flop, a fifth D flip-flop and a sixth D flip-flop, wherein the third D flip-flop, the fourth D flip-flop, the fifth D flip-flop and the sixth D flip-flop each has a clock terminal, an input terminal and an output terminal; the clock terminal of the third D flip-flop, the clock terminal of the fourth D flip-flop, the clock terminal of the fifth D flip-flop and the clock terminal of the sixth D flip-flop are connected, and a corresponding connecting terminal is a clock terminal of the shift register; the output terminal of the third D flip-flop is a first-bit parallel data output terminal of the shift register; the input terminal of the third D flip-flop is connected to the output terminal of the fourth D flip-flop, and a corresponding connecting terminal is a second-bit parallel data output terminal of the shift register; the input terminal of the fourth D flip-flop is connected to the output terminal of the fifth D flip-flop, and a corresponding connecting terminal is a third-bit parallel data output terminal of the shift register; the input terminal of the fifth D flip-flop is connected to the output terminal of the sixth D flip-flop, and a corresponding connecting terminal is a fourth-bit parallel data output terminal of the shift register; and the output terminal of the sixth D flip-flop is a serial data input terminal of the shift register.

Compared with the prior art, the invention has the following beneficial effects: the true random number generator with a dynamic compensation capacity is provided with the sensitive amplifier and the load matching unit; the sensitive amplifier comprises the first PMOS transistor, the second PMOS transistor, the third PMOS transistor, the fourth PMOS transistor, the first NMOS transistor, the second NMOS transistor and the two NMOS arrays; each NMOS array comprises the third NMOS transistor, the fourth NMOS transistor, the fifth NMOS transistor, the sixth NMOS transistor, the seventh NMOS transistor, the eighth NMOS transistor, the ninth NMOS transistor, the tenth NMOS transistor, the eleventh NMOS transistor, the twelfth NMOS transistor and the thirteenth NMOS transistor; the load matching unit comprises the first D flip-flop and the second D flip-flop; the load matching unit is configured at the output terminal and the inverted output terminal of the sensitive amplifier, so that load matching of the left terminal and the right terminal of the sensitive amplifier is ensured, circuit imbalance caused by load mismatch is eliminated, and feedback regulation is made easier; when the second clock signal is at a low level 0, the sensitive amplifier enters into a pre-charging stage, the first PMOS transistor and the fourth PMOS transistor are P-on, the two NMOS arrays are both turned off, and the output terminal and the complementary output terminal of the sensitive amplifier are pre-charged to a high level. When the second clock signal is at a high level 1, the sensitive amplifier enters into an evaluation stage, the first PMOS transistor and the fourth PMOS transistor are both turned off, the two NMOS arrays are turned on and saturated, and the sensitive amplifier starts to carry out evaluation. If the source-drain current of the first NMOS array (the current prior to the input/output terminal and the ground terminal) is smaller than that of the second NMOS array, the voltage of the output terminal of the sensitive amplifier is preferentially discharged by the second NMOS array to a low level, while the inverted output terminal of the sensitive amplifier is rapidly charged to a high level. If the source-drain current of the first NMOS array is higher than that of the second NMOS array, the voltage of the inverted output terminal of the sensitive amplifier is preferentially discharged by the first NMOS array to a low level, while the output terminal of the sensitive amplifier is rapidly charged to a high level. If the source-drain current of the first NMOS array is equal to that of the second NMOS array, the sensitive amplifier enters into the metastable state and outputs half of the supply voltage. Although the source-drain current of the first NMOS array is equal to that of the second NMOS array when the left terminal and the right terminal of the sensitive amplifier are matched, the source-drain current randomly fluctuates due to the presence of thermal noise, and thus, one bit of random output is generated. The load matching unit is connected to the output terminal and the inverted output terminal of the sensitive amplifier to isolate circuit imbalance caused by load mismatch. The sensitive amplifier generates and outputs one bit of random number in the evaluation stage, the load matching unit stores the one bit of random number generated by the sensitive amplifier into the shift register, the loop control logic reads a 4-bit output sequence from the shift register every four clock cycles and generates two 5-bit parallel control signals according to the 4-bit output sequence to carry out single-stage isometric negative feedback regulation on the sensitive amplifier, wherein the single-stage isometric negative feedback regulation includes a dynamic configuration mode and a dynamic monitoring mode. The loop control logic enters into the dynamic configuration mode first. In the dynamic configuration mode, the loop control logic generates a first 5-bit parallel control signal to regulate the first NMOS array and generates a second 5-bit parallel control signal to regulate the second NMOS array to compensate for process deviations and environment changes, so that the probabilities of 0 and 1 in the random sequence generated by the sensitive amplifier are 40%-60%, wherein the first 5-bit parallel control signal controls the discharging speed of the inverted output terminal of the sensitive amplifier, so that with the increase of the first 5-bit parallel control signal, the inverted output terminal of the sensitive amplifier has a larger probability of potential 0. The second 5-bit parallel control signal controls the discharging speed of the output terminal of the sensitive amplifier, so that with the increase of the second 5-bit parallel control signal, the output terminal of the sensitive amplifier has a larger probability of potential 0. In the dynamic configuration mode, the loop control logic extracts one 4-bit output sequence from the shift register for detection every four clock cycles and carries out feedback regulation on the sensitive amplifier according to the probabilities of 0 and 1 in the output sequence, so that the true random number generator works within a high-entropy range. If the loop control logic detects that 0 and 1 are uniformly distributed in the 4-bit output sequence (namely 1010 or 0101), configuration of the first 5-bit parallel control signal and the second 5-bit parallel control signal is completed, the first 5-bit parallel control signal and the second 5-bit parallel control signal remain unchanged, and the loop control logic enters into the dynamic monitoring mode. In the dynamic monitoring mode, the loop control logic detects whether or not the 4-bit output sequence of the sensitive amplifier deviates due to work environment changes, particularly, the loop control logic extracts one 4-bit output sequence from the shift register for detection every four clock cycles, and if twelve 1 or 0 are continuously detected in the output sequence of the sensitive amplifier, it is determined that the output sequence is not random anymore, and in this case, the first 5-bit parallel control signal and the second 5-bit parallel control signal which are finally configured in the previous dynamic configuration mode are no longer suitable for the current work environment, and the loop control logic enters into the dynamic monitoring mode again; otherwise, the loop control logic stays in the current dynamic monitoring mode, the first 5-bit parallel control signal and the second 5-bit parallel control signal remain unchanged. In this way, the true random number generator can eliminate circuit imbalance caused by load mismatch through the load matching unit and can continuously work within a high-entropy range by regulating the sensitive amplifier through the loop control logic, thereby realizing simple feedback regulation and high robustness.

DETAILED DESCRIPTION OF THE INVENTION

Figure 1:
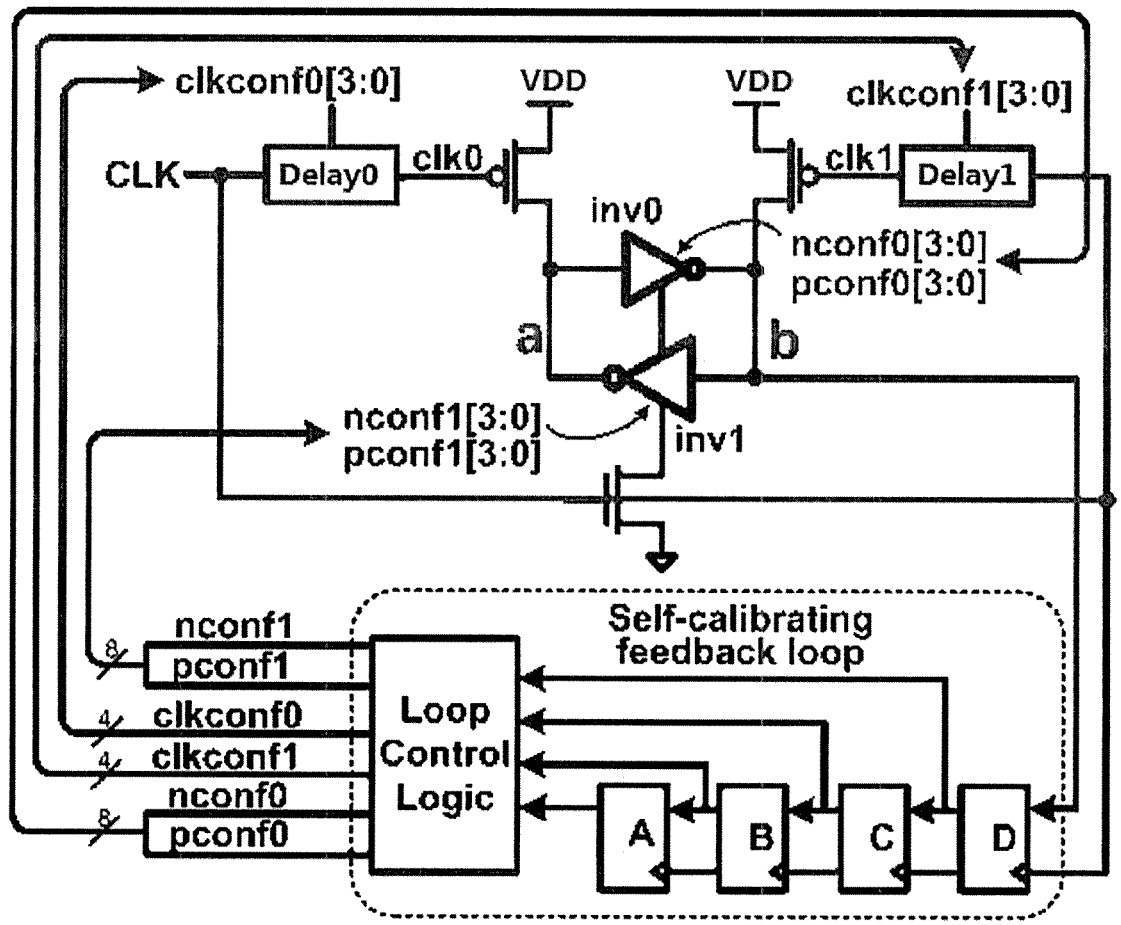
FIG. 1 is a structural principle block diagram of an existing true random number generator.
Figure 2:
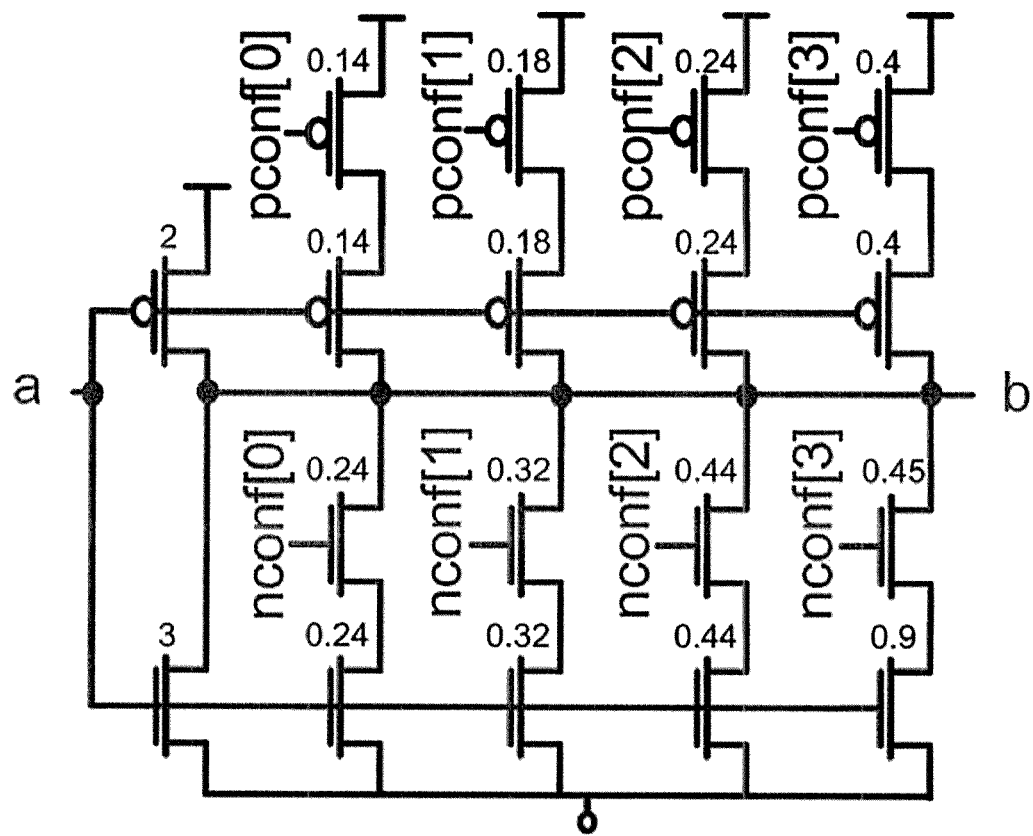
FIG. 2 is a circuit diagram of inverters of the existing true random number generator.
Figure 3:
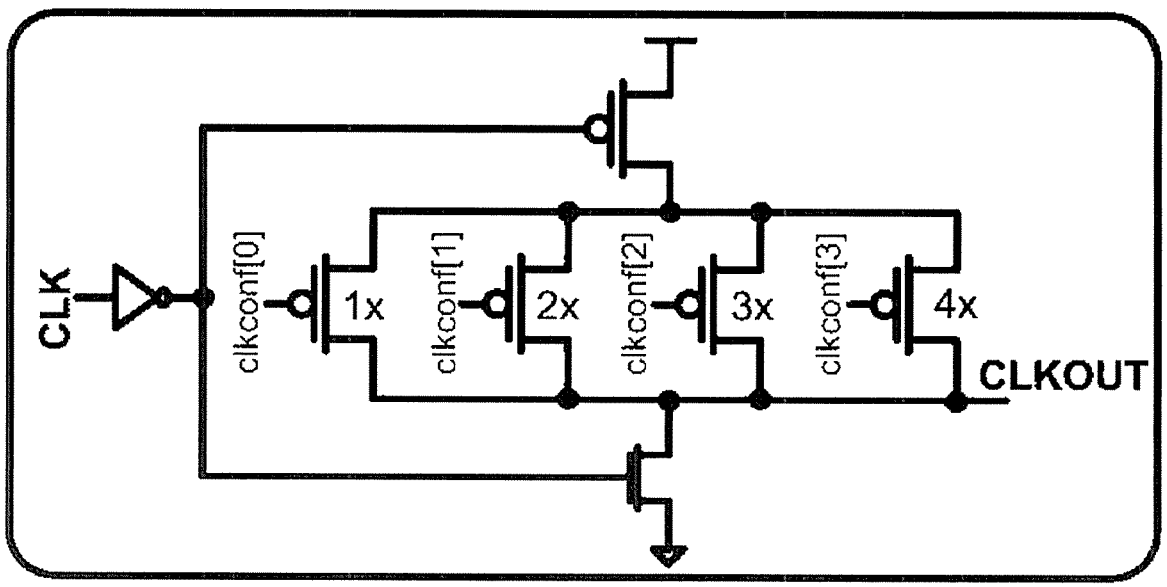
FIG. 3 is a circuit diagram of delay cells of the existing true random number generator.
Figure 4:
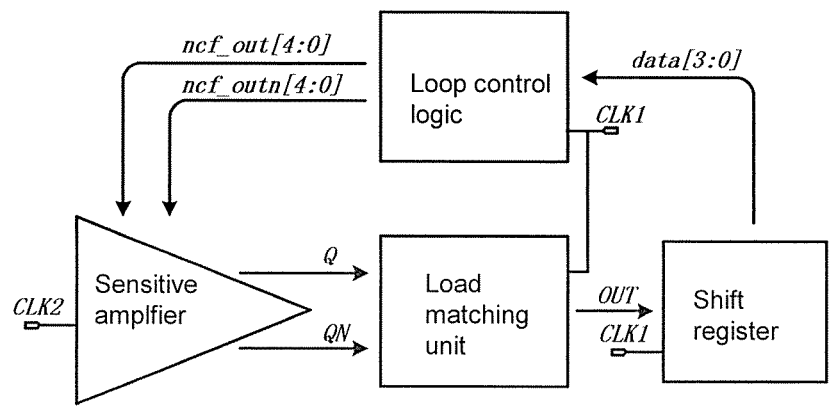
FIG. 4 is a structural view of a true random number generator with a dynamic compensation capacity of the invention.
Figure 5:
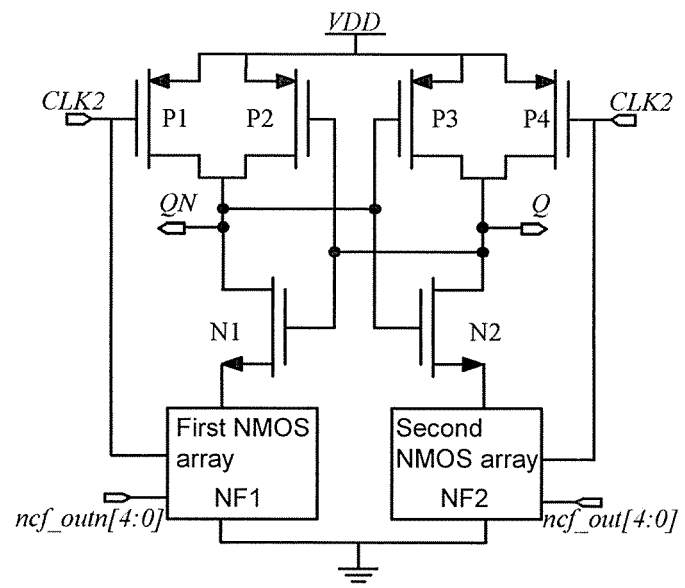
FIG. 5 is a circuit diagram of a sensitive amplifier of the true random number generator with a dynamic compensation capacity of the invention.
Figure 6:
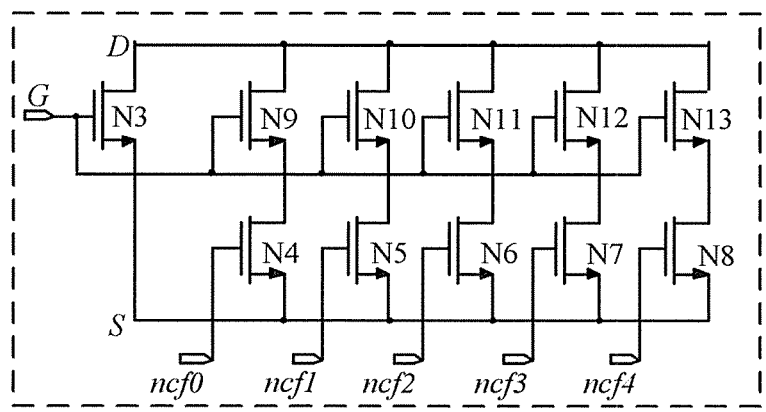
FIG. 6 is a circuit diagram of an NMOS array of the true random number generator with a dynamic compensation capacity of the invention.
Figure 7:
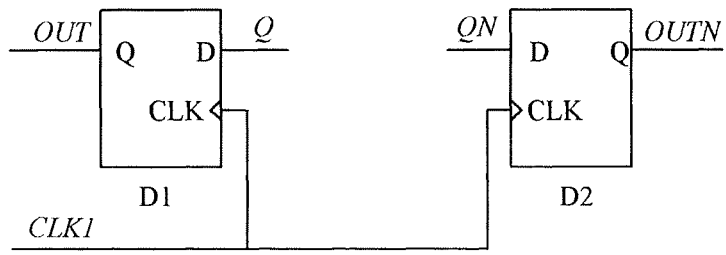
FIG. 7 is a circuit diagram of a load matching unit of the true random number generator with a dynamic compensation capacity of the invention.

The invention is further expounded below with reference to the accompanying drawings and embodiments.

Embodiment 1

As shown in FIGS. 4-7, a true random number generator with a dynamic compensation capacity comprises a loop control logic and a shift register used for storing output sequences. The loop control logic has a clock terminal, an input terminal, a first output terminal and a second output terminal. The shift register has a clock terminal, a serial data input terminal and a 4-bit parallel data output terminal. The data input terminal of the loop control logic is connected to the output terminal of the shift register and is used to acquire a 4-bit output sequence data [3:0] stored in the shift register. The clock terminal of the loop control logic is connected to the clock terminal of the shift register, and a first clock signal CLK1 is accessed to a connecting terminal of the clock terminal of the loop control logic and the clock terminal of the shift register. The first output terminal of the loop control logic is used to output a first 5-bit parallel control signal ncf_outn[4:0]. The second output terminal of the loop control logic is used to output a second 5-bit parallel control signal ncf_out[4:0]. The true random number generator with a dynamic compensation capacity further comprises a sensitive amplifier and a load matching unit. The sensitive amplifier comprises a first PMOS transistor P1, a second PMOS transistor P2, a third PMOS transistor P3, a fourth PMOS transistor P4, a first NMOS transistor N1, a second NMOS transistor N2 and two NMOS arrays. Each NMOS array comprises a third NMOS transistor N3, a fourth NMOS transistor N4, a fifth NMOS transistor N5, a sixth NMOS transistor N6, a seventh NMOS transistor N7, an eighth NMOS transistor N8, a ninth NMOS transistor N9, a tenth NMOS transistor N10, an eleventh NMOS transistor N11, a twelfth NMOS transistor N12 and a thirteenth NMOS transistor N13, wherein a drain of the third NMOS transistor N3, a drain of the ninth NMOS transistor N9, a drain of the tenth NMOS transistor N10, a drain of the eleventh NMOS transistor N11, a drain of the twelfth NMOS transistor N12 and a drain of the thirteenth NMOS transistor N13 are connected, and a corresponding connecting terminal is an input/output terminal of the NMOS array; a gate of the third NMOS transistor N3, a gate of the ninth NMOS transistor N9, a gate of the tenth NMOS transistor N10, a gate of the eleventh NMOS transistor N11, a gate of the twelfth NMOS transistor N12 and a gate of the thirteenth NMOS transistor N13 are connected, and a corresponding connecting terminal is a clock terminal of the NMOS array; a source of the third NMOS transistor N3, a source of the fourth NMOS transistor N4, a source of the fifth NMOS transistor N5, a source of the sixth NMOS transistor N6, a source of the seventh NMOS transistor N7 and a source of the eighth NMOS transistor N8 are connected, and a corresponding connecting terminal is a ground terminal of the NMOS array; a gate of the fourth NMOS transistor N4 is a first configuration terminal of the NMOS array, a gate of the fifth NMOS transistor N5 is a second configuration terminal of the NMOS array, a gate of the sixth NMOS transistor N6 is a third configuration terminal of the NMOS array, a gate of the seventh NMOS transistor N7 is a fourth configuration terminal of the NMOS array, and a gate of the eighth NMOS transistor N8 is a fifth configuration terminal of the NMOS array; a drain of the fourth NMOS transistor N4 is connected to a source of the ninth NMOS transistor N9, a drain of the fifth NMOS transistor N5 is connected to a source of the tenth NMOS transistor N10, a drain of the sixth NMOS transistor N6 is connected to a source of the eleventh NMOS transistor N11, a drain of the seventh NMOS transistor N7 is connected to a source of the twelfth NMOS transistor N12, and a drain of the eighth NMOS transistor N8 is connected to a source of the thirteenth NMOS transistor N13. A power supply VDD is accessed to a source of the first PMOS transistor P1, a source of the second PMOS transistor P2, a source of the third PMOS transistor P3 and a source of the fourth PMOS transistor P4. A gate of the first PMOS transistor P1 and a gate of the fourth PMOS transistor P4 are connected to the clock terminals of the two NMOS arrays, and a corresponding connecting terminal is a clock terminal of the sensitive amplifier. A second clock signal CLK2 is accessed to the clock signal of the sensitive amplifier, and the first clock signal CLK1 is a delay signal obtained after the second clock signal CLK2 is delayed by three fourths of the cycle. A drain of the first PMOS transistor P1, a drain of the second PMOS transistor P2, a drain of the first NMOS transistor N1, a gate of the second NMOS transistor N2 and a gate of the third PMOS transistor P3 are connected, and a corresponding connecting terminal is an inverted output terminal of the sensitive amplifier. A drain of the third PMOS transistor P3, a drain of the fourth PMOS transistor P4, a gate of the second PMOS transistor P2, a gate of the first NMOS transistor N1 and a drain of the second NMOS transistor N2 are connected, and a corresponding connecting terminal is an output terminal of the sensitive amplifier. A source of the first NMOS transistor N1 is connected to the input/out terminal of the first NMOS array NF1, and a source of the second NMOS transistor N2 is connected to the input/output terminal of the second NMOS array NF2. The ground terminals of the two NMOS arrays are grounded. The first configuration terminal of the first NMOS array NF1 is a first control terminal of the sensitive amplifier and allows a first bit of the first 5-bit parallel control signal ncf_outn[4:0] to be accessed thereto; the second configuration terminal of the first NMOS array NF1 is a second control terminal of the sensitive amplifier and allows a second bit of the first 5-bit parallel control signal ncf_outn [4:0] to be accessed thereto; the third configuration terminal of the first NMOS array NF1 is a third control terminal of the sensitive amplifier and allows a third bit of the first 5-bit parallel control signal ncf_outn[4:0] to be accessed thereto; the fourth configuration terminal of the first NMOS array NF1 is a fourth control terminal of the sensitive amplifier and allow a fourth bit of the first 5-bit parallel control signal ncf_outn[4:0] to be accessed thereto; the fifth configuration terminal of the first NMOS array NF1 is a fifth control terminal of the sensitive amplifier and allows a fifth bit of the first 5-bit parallel control signal ncf_outn[4:0] to be accessed thereto; the first configuration terminal of the second NMOS array NF2 is a sixth control terminal of the sensitive amplifier and allows a first bit of the second 5-bit parallel control signal ncf_out[4:0] to be accessed thereto; the second configuration terminal of the second NMOS array NF2 is a seventh control terminal of the sensitive amplifier and allows a second bit of the second 5-bit parallel control signal ncf_out[4:0] to be accessed thereto; the third configuration terminal of the second NMOS array NF2 is an eighth control terminal of the sensitive amplifier and allows a third bit of the second 5-bit parallel control signal ncf_out[4:0] to be accessed thereto; the fourth configuration terminal of the second NMOS array NF2 is a ninth control terminal of the sensitive amplifier and allows a fourth bit of the second 5-bit parallel control signal ncf_out[4:0] to be accessed thereto; the fifth configuration terminal of the second NMOS array NF2 is a tenth control terminal of the sensitive amplifier and allow a fifth bit of the second 5-bit parallel control signal ncf_out[4:0] to be accessed thereto. The load matching unit comprises a first D flip-flop D1 and a second D flip-flop D2. The first D flip-flop D1 and the second D flip-flop D2 each has a clock terminal, an input terminal and an output terminal, wherein the input terminal of the first D flip-flop D1 is an input terminal of the load matching unit, and the input terminal of the second D flip-flop D2 is an inverted input terminal of the load matching unit; the clock terminal of the first D flip-flop D1 is connected to the clock terminal of the second D flip-flop D2, and a corresponding connecting terminal is a clock terminal of the load matching unit and allows the first clock signal CKL1 to be accessed thereto; and the output terminal of the first D flip-flop D1 is an output terminal of the load matching unit. The output terminal of the sensitive amplifier is connected to the input terminal of the load matching unit, the inverted output terminal of the sensitive amplifier is connected to the inverted input terminal of the load matching unit, and the output terminal of the load matching unit is connected to the serial data input terminal of the shift register.

The sensitive amplifier generates and outputs one bit of random number at each evaluation stage and is driven by the second clock signal CLK2 to store the random number into the shift register through the load matching unit, and the loop control logic reads a 4-bit output sequence data [3:0] from the shift register every four clock cycles and generates two 5-bit parallel control signals according to the 4-bit output sequence data [3:0] to dynamically configure or monitor the sensitive amplifier. The loop control logic enters into the dynamic configuration stage first. In the dynamic configuration stage, the loop control logic generates the first 5-bit parallel control signal ncf_outn[4:0] to regulate the first NMOS array NF1 and generates the second 5-bit parallel control signal ncf_out[4:0] to regulate the second NMOS array NF2 to compensate for process deviations and environment changes, so that the probabilities of 0 and 1 in the random sequence generated by the sensitive amplifier are 40%-60%, wherein the first 5-bit parallel control signal ncf_outn[4:0] controls the discharging speed of the inverted output terminal of the sensitive amplifier, so that with the increase of the first 5-bit parallel control signal ncf_outn[4:0], the inverted output terminal of the sensitive amplifier has a larger probability of potential 0; the second 5-bit parallel control signal ncf_out[4:0] controls the discharging speed of the output terminal of the sensitive amplifier, so that with the increase of the second 5-bit parallel control signal ncf_out[4:0], the output terminal of the sensitive amplifier has a larger probability of potential 0; and in the dynamic configuration stage, the loop control logic extracts one 4-bit output sequence data [3:0] from the shift register for detection every four clock cycles and carries out feedback regulation on the sensitive amplifier according to the probabilities of 0 and 1 in the output sequence, so that the true random number generator works within a high-entropy range. When the loop control logic detects that 0 and 1 are uniformly distributed in the 4-bit output sequence data [3:0] (namely 1010 or 0101), configuration of the first 5-bit parallel control signal ncf_outn[4:0] and the second 5-bit parallel control signal ncf_out[4:0] is completed, the first 5-bit parallel control signal ncf_outn[4:0] and the second 5-bit parallel control signal ncf_out[4:0] remain unchanged, and the loop control logic enters into the dynamic monitoring stage. In the dynamic monitoring stage, the loop control logic detects whether or not the output sequence of the sensitive amplifier deviates due to work environment changes, particularly, the loop control logic extracts the 4-bit output sequence data [3:0] from the shift register for detection every four clock cycles, and when twelve 1 or 0 are continuously detected in the output sequence of the sensitive amplifier, it is determined that the output sequence is not random anymore, and in this case, the first 5-bit parallel control signal ncf_outn[4:0] and the second 5-bit parallel control signal ncf_out[4:0] which are finally configured in the previous dynamic configuration stage are no longer suitable for the current work environment, and the loop control logic enters into the dynamic configuration stage again; otherwise, the loop control logic stays in the current dynamic monitoring stage, the first 5-bit parallel control signal ncf_outn[4:0] and the second 5-bit parallel control signal ncf_out[4:0] remain unchanged.

Embodiment 2

Figure 8:
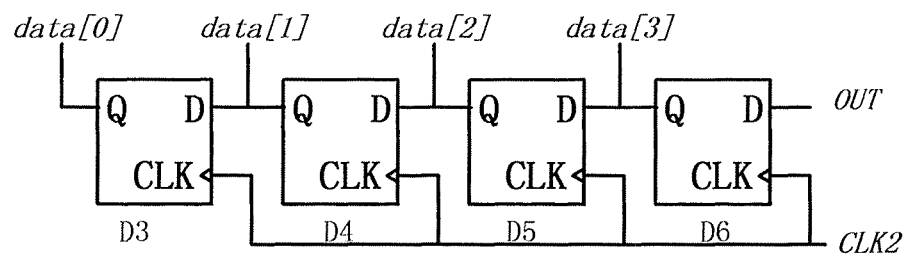
FIG. 8 is a circuit diagram of a shift register of the true random number generator with a dynamic compensation capacity of the invention.

This embodiment is basically identical with embodiment 1 and differs from embodiment 1 only in the following aspects: As shown in FIG. 8, the shift register comprises a third D flip-flop D3, a fourth D flip-flop D4, a fifth D flip-flop D5 and a sixth D flip-flop D6, wherein the third D flip-flop D3, the fourth D flip-flop D4, the fifth D flip-flop D5 and the sixth D flip-flop D6 each has a clock terminal, an input terminal and an output terminal; the clock terminal of the third D flip-flop D3, the clock terminal of the fourth D flip-flop D4, the clock terminal of the fifth D flip-flop D5 and the clock terminal of the sixth D flip-flop D6 are connected, and a corresponding connecting terminal is a clock terminal of the shift register; the output terminal of the third D flip-flop D3 is a first-bit parallel data output terminal of the shift register; the input terminal of the third D flip-flop D3 is connected to the output terminal of the fourth D flip-flop D4, and a corresponding connecting terminal is a second-bit parallel data output terminal of the shift register; the input terminal of the fourth D flip-flop D4 is connected to the output terminal of the fifth D flip-flop D5, and a corresponding connecting terminal is a third-bit parallel data output terminal of the shift register; the input terminal of the fifth D flip-flop D5 is connected to the output terminal of the sixth D flip-flop D6, and a corresponding connecting terminal is a fourth-bit parallel data output terminal of the shift register; and the input terminal of the sixth D flip-flop D6 is a serial data input terminal of the shift register.

Figure 9:
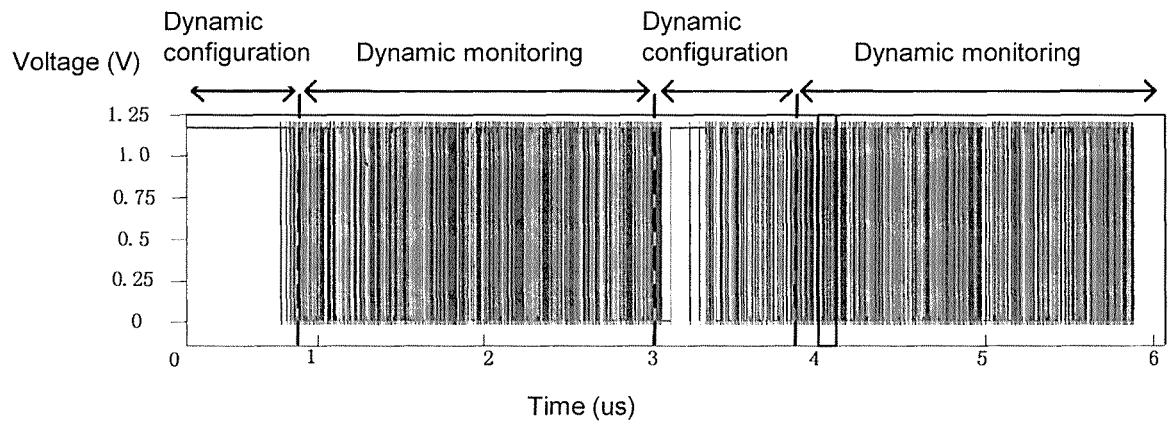
FIG. 9 is a simulation oscillogram of an output sequence of the true random number generator with a dynamic compensation capacity of the invention.

FIG. 9 shows the simulation oscillogram of the output sequences of the true random number generator with a dynamic compensation capacity. As shown in FIG. 9, the output sequence has a bias to 1 at 0 us; after about 0.4 us of dynamic configuration, the output sequence of the true random number generator is made random, and the true random number generator enters into the dynamic monitoring stage; a process deviation is generated again at 1.5 us, the output sequence has a bias to 1, and the true random number generator enters into the dynamic configuration stage again and completes dynamic configuration at about 1.92 us to enter into the dynamic monitoring stage. Simulation results indicate that the true random number generator can fulfill an adaptive matching function and is able to resist process deviations. NIST random number test is a statistical packet developed by National Institute of Standards and Technology and is used to determine all non-random possibilities of sequences. About 26000 bits of data obtained after Von Neumann post-processing of 100000 bits of original sequences are input to an NIST test kit to be tested in ten groups. The test results are shown in table 1.

TABLE 1

| NIST test | P value | Pass rate |
|---|---|---|
| Frequency | 0.5341 | 100% |
| Block Frequency | 0.9114 | 100% |
| Cumulative Sums | 0.7399 | 100% |
| Runs | 0.1531 | 100% |
| Longest Runs of 1's | 0.5341 | 100% |
| Rank | 0.6127 | 90% |
| Discrete Fourier Transform | 0.7399 | 100% |
| Non-overlapping Template | 0.1223 | 100% |
| Overlapping Template | 0.4336 | 100% |
| Approximate Entropy | 0.4808 | 100% |
| Serial | 0.5341 | 100% |
| Linear Complexity | 0.0668 | 100% |

It can be known by analyzing the test results in Table 1 that all the P values of the true random number generator of the invention are on high levels, which indicates that the true random number generator has good randomness.

What is claimed is:
1. A true random number generator with a dynamic compensation capacity, comprising:
   a loop control logic; and
   a shift register used for storing output sequences,
   wherein the loop control logic comprises:
   a clock terminal,
   a data input terminal,
   a first output terminal and
   a second output terminal;
   wherein the shift register comprises
   a clock terminal,
   a serial data input terminal; and
   a 4-bit parallel data output terminal;

wherein the data input terminal of the loop control logic is connected to the 4-bit parallel data output terminal of the shift register and is used to acquire 4-bit output sequences stored in the shift register; the clock terminal of the loop control logic is connected to the clock terminal of the shift register, and a first clock signal is accessed to a connecting terminal of the clock terminal of the loop control logic and the clock terminal of the shift register, wherein the first output terminal of the loop control logic is used to output a first 5-bit parallel control signal, and the second output terminal of the loop control logic is used to output a second 5-bit parallel control signal, wherein the true random number generator with a dynamic compensation capacity further comprises a sensitive amplifier and a load matching unit, wherein the sensitive amplifier comprises a first PMOS transistor, a second PMOS transistor, a third PMOS transistor, a fourth PMOS transistor, a first NMOS transistor, a second NMOS transistor and two NMOS arrays; each of the two NMOS arrays comprises a third NMOS transistor, a fourth NMOS transistor, a fifth NMOS transistor, a sixth NMOS transistor, a seventh NMOS transistor, an eighth NMOS transistor, a ninth NMOS transistor, a tenth NMOS transistor, an eleventh NMOS transistor, a twelfth NMOS transistor and a thirteenth NMOS transistor, wherein a drain of the third NMOS transistor, a drain of the ninth NMOS transistor, a drain of the tenth NMOS transistor, a drain of the eleventh NMOS transistor, a drain of the twelfth NMOS transistor and a drain of the thirteenth NMOS transistor are connected, and a corresponding connecting terminal is an input/output terminal of each of the two NMOS arrays, wherein a gate of the third NMOS transistor, a gate of the ninth NMOS transistor, a gate of the tenth NMOS transistor, a gate of the eleventh NMOS transistor, a gate of the twelfth NMOS transistor and a gate of the thirteenth NMOS transistor are connected, and a corresponding connecting terminal is a clock terminal of each of the two NMOS arrays, wherein a source of the third NMOS transistor, a source of the fourth NMOS transistor, a source of the fifth NMOS transistor, a source of the sixth NMOS transistor, a source of the seventh NMOS transistor and a source of the eighth NMOS transistor are connected, and a corresponding connecting terminal is a ground terminal of each of the two NMOS arrays, wherein a gate of the fourth NMOS transistor is a first configuration terminal of each of the two NMOS arrays, a gate of the fifth NMOS transistor is a second configuration terminal of each of the two NMOS arrays, a gate of the sixth NMOS transistor is a third configuration terminal of each of the two NMOS arrays, a gate of the seventh NMOS transistor is a fourth configuration terminal of the NMOS array each of the two NMOS arrays, and a gate of the eighth NMOS transistor is a fifth configuration terminal of each of the two NMOS arrays, wherein a drain of the fourth NMOS transistor is connected to a source of the ninth NMOS transistor, a drain of the fifth NMOS transistor is connected to a source of the tenth NMOS transistor, a drain of the sixth NMOS transistor is connected to a source of the eleventh NMOS transistor, a drain of the seventh NMOS transistor is connected to a source of the twelfth NMOS transistor, and a drain of the eighth NMOS transistor is connected to a source of the thirteenth NMOS transistor;

wherein a power supply is accessed to a source of the first PMOS transistor, a source of the second PMOS transistor, a source of the third PMOS transistor and a source of the fourth PMOS transistor, wherein a gate of the first PMOS transistor and a gate of the fourth PMOS transistor are connected to the clock terminal of each of the two NMOS arrays, and a corresponding connecting terminal is a clock terminal of the sensitive amplifier, wherein a second clock signal is accessed to a clock signal of the sensitive amplifier, wherein a drain of the first PMOS transistor, a drain of the second PMOS transistor, a drain of the first NMOS transistor, a gate of the second NMOS transistor and a gate of the third PMOS transistor are connected, and a corresponding connecting terminal is an inverted output terminal of the sensitive amplifier, wherein a drain of the third PMOS transistor, a drain of the fourth PMOS transistor, a gate of the second PMOS transistor, a gate of the first NMOS transistor and a drain of the second NMOS transistor are connected, and a corresponding connecting terminal is an output terminal of the sensitive amplifier, wherein a source of the first NMOS transistor is connected to the input/out terminal of a first NMOS array of the two NMOS arrays, and a source of the second NMOS transistor is connected to the input/output terminal of a second NMOS array of the two NMOS arrays, wherein the ground terminals of the two NMOS arrays are all grounded, wherein the first configuration terminal of the first NMOS array is a first control terminal of the sensitive amplifier and allows a first bit of the first 5-bit parallel control signal to be accessed thereto; the second configuration terminal of the first NMOS array is a second control terminal of the sensitive amplifier and allows a second bit of the first 5-bit parallel control signal to be accessed thereto; the third configuration terminal of the first NMOS array is a third control terminal of the sensitive amplifier and allows a third bit of the first 5-bit parallel control signal to be accessed thereto; the fourth configuration terminal of the first NMOS array is a fourth control terminal of the sensitive amplifier and allow a fourth bit of the first 5-bit parallel control signal to be accessed thereto; the fifth configuration terminal of the first NMOS array is a fifth control terminal of the sensitive amplifier and allows a fifth bit of the first 5-bit parallel control signal to be accessed thereto, wherein the first configuration terminal of the second NMOS array is a sixth control terminal of the sensitive amplifier and allows a first bit of the second 5-bit parallel control signal to be accessed thereto; the second configuration terminal of the second NMOS array is a seventh control terminal of the sensitive amplifier and allows a second bit of the second 5-bit parallel control signal to be accessed thereto; the third configuration terminal of the second NMOS array is an eighth control terminal of the sensitive amplifier and allows a third bit of the second 5-bit parallel control signal to be accessed thereto; the fourth configuration terminal of the second NMOS array is a ninth control terminal of the sensitive amplifier and allows a fourth bit of the second 5-bit parallel control signal to be accessed thereto; the fifth configuration terminal of the second NMOS array is a tenth control terminal of the sensitive amplifier and allow a fifth bit of the second 5-bit parallel control signal to be accessed thereto, wherein the load matching unit comprises a first D flip-flop and a second D flip-flop, wherein the first D flip-flop and the second D flip-flop each has a clock terminal, an input terminal and an output terminal; the input terminal of the first D flip-flop is an input terminal of the load matching unit, and the input terminal of the second D flip-flop is an inverted input terminal of the load matching unit; the clock terminal of the first D flip-flop is connected to the clock terminal of the second D flip-flop, and a corresponding connecting terminal is a clock terminal of the load matching unit and allows the first clock signal to be accessed thereto; the output terminal of the first D flip-flop is an output terminal of the load matching unit;

the output terminal of the sensitive amplifier is connected to the input terminal of the load matching unit, the inverted output terminal of the sensitive amplifier is connected to the inverted input terminal of the load matching unit, and the output terminal of the load matching unit is connected to the serial data input terminal of the shift register, wherein the sensitive amplifier generates and outputs one bit of random number at each evaluation stage and is driven by the second clock signal to store the random number into the shift register through the load matching unit, and the loop control logic reads a 4-bit output sequence from the shift register every four clock cycles and generates two 5-bit parallel control signals according to the 4-bit output sequence to dynamically configure or monitor the sensitive amplifier; the loop control logic enters into the dynamic configuration stage first, and in a dynamic configuration stage, the loop control logic generates the first 5-bit parallel control signal to regulate the first NMOS array and generates the second 5-bit parallel control signal to regulate the second NMOS array to compensate for process deviations and environment changes, so that the probabilities of 0 and 1 in the random sequence generated by the sensitive amplifier are 40%-60%, wherein the first 5-bit parallel control signal controls a discharging speed of the inverted output terminal of the sensitive amplifier, so that with the increase of the first 5-bit parallel control signal, the inverted output terminal of the sensitive amplifier has a larger probability of potential 0; the second 5-bit parallel control signal controls a discharging speed of the output terminal of the sensitive amplifier, so that with the increase of the second 5-bit parallel control signal, the output terminal of the sensitive amplifier has a larger probability of potential 0;

wherein in the dynamic configuration stage, the loop control logic extracts one 4-bit output sequence from the shift register for detection every four clock cycles and carries out feedback regulation on the sensitive amplifier according to the probabilities of 0 and 1 in the output sequence, so that the true random number generator works within a high-entropy range; when the loop control logic detects that 0 and 1 are uniformly distributed in the 4-bit output sequence (namely 1010 or 0101), configuration of the first 5-bit parallel control signal and the second 5-bit parallel control signal is completed, the first 5-bit parallel control signal and the second 5-bit parallel control signal remain unchanged, and the loop control logic enters into a dynamic monitoring stage, wherein in the dynamic monitoring stage, the loop control logic detects whether or not the output sequence of the sensitive amplifier deviates due to work environment changes, particularly, the loop control logic extracts the 4-bit output sequence from the shift register for detection every four clock cycles, and when twelve 1 or 0 are continuously detected in the output sequence of the sensitive amplifier, it is determined that the output sequence is not random anymore, and in this case, the first 5-bit parallel control signal and the second 5-bit parallel control signal which are finally configured in the previous dynamic configuration stage are no longer suitable for the current work environment, and the loop control logic enters into the dynamic configuration stage again; otherwise, the loop control logic stays in the current dynamic monitoring stage, the first 5-bit parallel control signal and the second 5-bit parallel control signal remain unchanged.

2. The true random number generator with a dynamic compensation capacity according to claim 1, wherein the shift register further comprises a third D flip-flop, a fourth D flip-flop, a fifth D flip-flop and a sixth D flip-flop, wherein the third D flip-flop, the fourth D flip-flop, the fifth D flip-flop and the sixth D flip-flop each has a clock terminal, an input terminal and an output terminal, wherein the clock terminal of the third D flip-flop, the clock terminal of the fourth D flip-flop, the clock terminal of the fifth D flip-flop and the clock terminal of the six D flip-flop are connected, and a corresponding connecting terminal is a clock terminal of the shift register, wherein the output terminal of the third D flip-flop is a first-bit parallel data output terminal of the shift register, wherein the input terminal of the third D flip-flop is connected to the output terminal of the fourth D flip-flop, and a corresponding connecting terminal is a second-bit parallel data output terminal of the shift register; the input terminal of the fourth D flip-flop is connected to the output terminal of the fifth D flip-flop, and a corresponding connecting terminal is a third-bit parallel data output terminal of the shift register; the input terminal of the fifth D flip-flop is connected to the output terminal of the sixth D flip-flop, and a corresponding connecting terminal is a fourth-bit parallel data output terminal of the shift register; and the input terminal of the sixth D flip-flop is a serial data input terminal of the shift register.

* * * * *